United States Patent [19]

Leverrier

[11] Patent Number: 5,877,246

[45] Date of Patent: Mar. 2, 1999

[54] MOULDING MATERIAL COMPOSITION

[75] Inventor: Thierry Leverrier, Torce En Vallee, France

[73] Assignee: Societe Civile Neurone, Sille Le Guillaume, France

[21] Appl. No.: 827,958

[22] Filed: May 12, 1997

Related U.S. Application Data

[63] Continuation-in-part of Ser. No. 498,624, Jul. 6, 1995, abandoned.

[51] Int. Cl.$^6$ ................. C08J 5/10; C08K 3/26; C08L 31/06
[52] U.S. Cl. ............. 524/425; 523/204; 523/219; 523/527; 524/494
[58] Field of Search ............... 523/219, 204, 523/527; 524/492, 493, 494, 400, 425, 437

[56] References Cited

U.S. PATENT DOCUMENTS 5,256,709  10/1993  Ross et al. ................. 523/510
5,571,866  11/1996  Nishida et al. .............. 525/98

*Primary Examiner*—James J. Seidleck
*Assistant Examiner*—U. K. Rajguru
*Attorney, Agent, or Firm*—Harrison & Egbert

[57] ABSTRACT

A moulding material composition for use in sanitary appliances, such as plastic sinks, baths, or wash basins, having a polyester resin in a monomer liquid having a polymerizable vinyl group, a thermoplastic non-shrink polymer, an organic peroxide, glass fibers, a stripping agent of either calcium or zinc stearate; and a filler material. The filler material can be either chemically coated glass microbeads or calcium carbonate in a marble crystalline form. The calcium carbonate can be provided with or without a pigment coating. In particular, the pigment can be of a polyurethane epoxy material.

3 Claims, No Drawings

MOULDING MATERIAL COMPOSITION

RELATED APPLICATION

The present application is a continuation-in-part of U.S. patent application Ser. No. 08/498,624, filed on Jul. 6, 1995, and entitled "MOULDING MATERIAL COMPOSITION", abandoned.

TECHNICAL FIELD

This invention concerns a moulding material composition specially intended for sanitary appliances such as plastic material sinks, baths, wash-basins.

The moulding material composition of the present invention is useful in the field of the sanitary appliances industry and, more particularly, of moulded components for products used as bathroom or kitchen equipment, such as sinks, baths or wash-basins.

The composition according to the invention has been specially designed for sanitary appliances but may also be used in applications for the building industry for purposes of external cladding or in the automotive or furniture industries.

BACKGROUND ART

Plastic material sanitary appliances are destined to replace traditional metal or ceramic sanitary appliances which have a high cost and a limited life.

The plastic material used today, comprising natural products, constitutes a composite mineral material. The manufactured product must therefore have high quality when applied, for instance, to a sink which must have a considerable impact resistance, since it is used with heavy and varied metal kitchen utensils. The surface of a sink should have abrasion resistance and mechanical strength.

Bearing in mind its environment, the sink must also remain extremely stable in contact with water and must not allow attack by the various domestic products. The material in use must also have good sound and thermal insulating properties.

Products now being manufactured show considerable disadvantages with regard to mechanical strength and stability in contact with water. The material in use does not allow products to be made in a perfectly uniform and an easily moulded manner at high temperature and under high pressure.

Materials are known based on thermosetting resin and mineral fillers, already used in the production of sanitary appliances. In the composition of known moulding materials, a non-saturated polyester-type resin is dissolved in a mixture of liquid monomers comprising, for instance, a vinyl group. A non-shrink thermoplastic is also known, which is active during the co-polymerization of the resin and of the monomer. An organic peroxide catalyst is also used to trigger the resin cross-linking.

It is also known for the compositions in use to utilize reinforcement fibers such as glass fibers, to ensure the rigidity of cross-linked material. Since these products are moulded at high temperature and under high pressure, a mould parting agent with known properties such as calcium and zinc stearate is utilized.

Fillers contained in the known resin are made up, more particularly, of silica and they do not include calcium carbonate.

It has been found that the use of calcium carbonate under certain conditions could, on the contrary, allow very good quality sanitary appliances to be obtained under certain conditions namely with a good resistance to abrasion and water.

If calcium carbonate in the form of marble with or without coating pigmentation is used, in combination with glass beads, it allows an unexpected effect to be achieved. This effect is the deterioration of fiberglass normally introduced to obtain the rigidity of cross-linked material.

SUMMARY OF THE INVENTION

It has effectively been found that in compositions containing glass fibers and fillers of which those particularly consisting of silica, the latter has a nefarious effect on the finished product since as a result of its abrasive power, the silica greatly reduces the the integrity of the glass fibers by causing breakages in considerable proportions. The reduction of the rigidifying power of glass fibers leads to sanitary appliances lacking mechanical strength and abrasion resistance, since glass fibers of a given length have been broken.

The presence of glass micro-beads in the fillers according to the invention also have a considerable advantage since they allow, as a result of their bead rolling, manufacturing processing with a better filling of moulds and an improved compactness and uniformity of the mixture.

Manufacture is thus improved and rejects can thus be reduced. In particular, the process reduces the surface microbubbles on the product. Chemical coating of the glass beads with "SILANE" (TM) induces a chemical bridging effect between the resin and the beads, which naturally improves the keying.

When marble in crystalline form is used complete with pigment coating, water absorption is reduced by masking the calcium carbonate with coated pigment.

One of the first purposes of the invention is to achieve a moulding material composition intended for sanitary appliances, thus forming a natural product with a good mechanical resistance and resisting abrasion and scratching, while also having good stability in water and heat. The sanitary appliances must also resist attack from domestic products and provide a good sound and thermal insulation.

Another aim of the invention is the use of glass fibers that suffer no damage or only slight damage due to the fillers. So as to accomplish that result, calcium carbonate in its marble crystalline form is used with or without pigment coating. As a result, its aggressive effect is greatly reduced compared with that of silica, allowing better preservation of the glass fibers.

Another advantage of the moulding material composition specially intended for sanitary appliances according to the invention is that it is easily used since a good mould-filling rate as well as good component stripping from the mould is achieved.

Another advantage of the moulding material composition specially intended for sanitary appliances according to the invention is to reduce the post-shrinkage rippling effect on the component since the presence of stacked glass beads allows the suppression of this effect.

Another advantage of the moulding material composition specially intended for sanitary appliances according to the invention is to provide a good finish to the component, the marble giving it a flecked appearance. Fleck grains may be pigmented or not, of different or identical color compared with the background. Another advantage of the moulding material composition specially intended for sanitary appliances according to the invention is to improve material flow under pressure thereby reducing production rejects due to porosity.

Another advantage of the moulding material composition specially intended for sanitary appliances according to the invention is that the use of glass micro-beads for increasing the compactness under pressure also allows an increase in alumina trihydrate content, a third filler which may eventually be added to the composition.

Another purpose of the moulding material composition specially intended for sanitary appliances according to the invention is that the manufactured products will show an improved resistance to physical and chemical attack resulting from the coating of glass micro-beads which causes a chemical bridging effect between the resin and the glass beads. This coating also provides improved product resistance to physical and chemical attack. Another advantage of the moulding material composition specially intended for sanitary appliances according to the invention is that the filler mixture of calcium carbonate, marble and glass micro-beads, produces a fluidic material easier to work and mould.

Another purpose of the moulding material composition specially intended for sanitary appliances according to the invention is to allow the production of colored products by the use of marble with a pigment coating of the epoxy polyurethane or saturated polyester type, thus allowing better adhesion to the substrate as well as a better chemical and mechanical performance.

Another advantage of the moulding material composition specially intended for sanitary appliances as in the invention is to give a good component finish.

Another advantage of the moulding material composition specially intended for sanitary appliances according to the invention is to reduce water absorption by the use of a well selected and balanced filler mixture of calcium carbonate in its marble crystalline form, chemically coated glass micro-beads, eventually completed by the action of a third ingredient in the form of alumina trihydrate.

Another advantage of the moulding material composition specially intended for sanitary appliances according to the invention, when using a pigmented product is to use a pigment coated marble which masks water absorption and further improves the quality of the product.

DETAILED DESCRIPTION OF THE INVENTION

For that purpose the invention concerns a moulding material composition specially intended for sanitary appliances, such as plastic material sinks, baths or washbasins allowing moulding under pressure and at high temperature, involving:

- a polyester resin cross-linking in a monomer liquid with a polymerizable vinyl group:
- a thermoplastic non-shrinking polyethylene type polymer soluble in the resin mixture,
- an organic peroxide catalyst to trigger cross-linking of the resin by the provision of free radicals during their destruction at high temperature,
- reinforcement fibers such as glass fibers to ensure the rigidity of the crosslinked material,
- a component stripping agent such as calcium or zinc stearate, wherein it contains fillers selected from:
- chemically coated soda calcium glass micro-beads, and
- calcium carbonate in its marble crystalline form with or without pigment coating, to reduce the glass fiber deterioration and obtain a sanitary appliances product resisting abrasion, heat and water.

The invention will be understood by reference to the following description, illustrated by one or several modes of implementation quoted for the purposes of non-restrictive examples.

The moulding material composition according to the invention applies more particularly to composite mineral material sanitary appliances, namely for the production of sinks, baths or washbasins or other moulded appliance or arrangement having essentially the same properties. It is known that sanitary appliances must have very good strength and insulation qualities. The sanitary appliances used for instance as a sink must consist of a very hard material to resist abrasion, namely from kitchen utensils, and must also withstand heat and attack by the frequently used domestic cleaning products.

These sanitary appliances should also have good sound and thermal insulation qualities. The sound insulation qualities should serve to reduce the transmission of kitchen and bathroom noises.

When selecting a composition, it is also necessary to take into account esthetic considerations of product presentation which must have a good surface finish, particularly with regard to brightness. For that purpose, if manufactured from plastic material, it will be important to ensure that moulding and stripping are carried out under good conditions.

In addition to such aesthetic surface finish considerations, sanitary appliances are often produced in colored materials for integration with other kitchen or bathroom equipment. In that case a perfectly distributed and uniform coloring must be ensured. It may also be required that in addition to coloring, the composition is required to impart a natural appearance such as that imitating marble or stone. In that event, it may be required that the product be of one color on one background and of another color for flecked grains.

Volume production by high temperature and high pressure moulding techniques may also have to be integrated in the choice of composition, since product cost must naturally be reduced and production rejects be as minimal as possible. It is known that with certain ill-adapted compositions, poor processing of the material is obtained as well as poor stripping qualities. The material in use must therefore have improved flow qualities under pressure in order to limit manufacturing rejects due to porosities or the presence of surface bubbles.

The composition of the moulding material according to the invention which will be moulded and polymerized under pressure and at high temperature comprises in a known manner a polyester resin cross-linking within a monomer liquid with a polymerizable vinyl group. That is the product which will crosslink and thereby give the moulded material a solid appearance.

Various types of polyester resins may be used and, as an example the use of an unsaturated polyester resin has been selected, consisting of an NPG orthophthalic type dissolved in styrene. Other similar products may be used, particularly a vinyl ester or an acrylic resin. In the general formula and according to applications, a quantity such as 10 to 20% by weight of unsaturated polyester resin may be used.

It has also been selected to integrate in a known manner in the composition according to the invention an non-shrinkage thermoplastic polymer of the type such as polyethylene soluble in a resin mixture.

This non-shrinkage polymer may, for instance, be of the type such as polyethylene soluble in the monomer resin mixture and co-polymerizable. It prevents the occurrence of the ripple effect during post-shrinking of the sanitary appliance during cooling.

This non-shrinkage polymer also allows a better appearance of the component finish, more particularly its brightness.

A non-shrinkage polyethylene-type polymer and/or saturated polyester polymer in proportions of 4 to 7% according to applications has been used.

As the non-shrinkage polymer, it would also be possible to use a saturated polyester, vinyl polyacetate, EVA (ethylene and vinyl acetate copolymers), ABS (acrylonitrile, butadiene and styrene copolymers), PMMA (methyl polymethacrylate).

An organic peroxide catalyst has also been integrated into the composition to trigger cross-linking of the resin by providing free radicals during their destruction at high temperature.

The use of the catalysts listed below has also been selected:

Tertiary butyl ethyl-2 perexanoate [0.03 to 0.5%]
Tertiary butyl perbenzoate [0.10 to 0.4%]
Tertiary butyl trimethyl-3,3,5 perhexanoate [0 to 0.1%]

The function of the catalysts is to trigger the cross-linking reaction of the resin comprising vinyl by providing free radicals during high temperature destruction.

With regard to catalysts, other products with the same function may be used, more particularly isopropyl carbonate and peroxiter-butyl carbonate.

A stripping agent is used in the composition to facilitate moulding and stripping of the component composition after polymerization. Such products are known at present with regard to these characteristics. Calcium or zinc stearates are used to facilitate component stripping by forming a fine coating between mould and component. That way a better component finish is obtained. These calcium and zinc stearate stripping agents are preferably used in percentages of the order of 0 to 1.7%.

It may also be advantageous in the composition according to the invention to integrate inhibitor agents such as parabenzoquinone which effectively has the property of delaying catalyst destruction up to a given temperature. Following the delayed reaction, there is better mould filling during polymerization. Similar other products such as hydroquinone or benzoquinone may be used. In the example here, parabenzoquinone is used in proportions by weight of 0 to 0.05%.

The use of glass fibers as reinforcement fibers in the composition allows an improved mechanical performance of the sanitary appliance compared with a similar fiberless product.

The function of these fibers is to ensure the rigidity of the cross-linked material and glass fibers cut to a length of 6 millimeters are preferably used.

Glass fibers of various origins may be used, namely synthetic fibers such as saturated or acrylic polyester or even vegetable fibers such as wollastonite.

The quantity of glass fibers used will be of the order of 5 to 10%, and it is important to be able to control this material to ensure good physical and chemical qualities of the sanitary appliances thus produced. As a result, it is important during the manufacturing process and in the choice of other materials entering into the composition to refrain from using over-abrasive products or processes which would lead to breakages of the glass fibers thereby reducing the rigidity. Such an effect is obtained namely when using silica-based fillers in the composition. The invention indicates for this purpose a preference for the preparation of less abrasive fillers consisting of calcium carbonate and glass micro-beads with chemical coating.

The mixture of fillers used for the composition according to the invention will preferably comprise 15 to 25% of calcium carbonate in its crystalline form as marble with or without pigment coating. Glass micro-beads are used in proportions by weight of 12 to 25%.

Calcium carbonate in its crystalline form as marble with or without pigment coating is used as marble with a grain size range of 0.20 to 7 millimeters.

As already indicated above, this filler has a low rate of water absorption compared with the crushed form.

There is no glass fiber deterioration in that agent, which is not the case with the use of silica. When a pigment coating is used such as epoxy, polyurethane or saturated polyester, as already specified, compared with silica, there is an advantage in the form of better adhesion to the substrate and better chemical and mechanical performance within that agent. The better adhesion and keying of the coating of the substrate generally gives better chemical and mechanical properties to the manufactured sanitary appliances.

The filler consisting of the soda calcium glass micro-beads is preferably used in proportions of 12 to 25%. The chemical coating may be SQUALANE(TM) for providing chemical bridging between the resin and the beads.

Glass micro-beads of a given grain size facilitate the flow of the material under pressure and thereby greatly reduce the number of rejects due to porosity.

The spherical shape gives an augmented compactness under pressure, which then allows the addition of a third ingredient as a filler, which could for instance be micronised alumina trihydrate.

Coating of glass micro-beads allows a chemical link with the resin, thus achieving a better moulded product performance under chemical and physical attack and more particularly with water and domestic cleaning products.

By an ordered and uniform displacement, the glass micro-beads intervene between the glass fibers and help to distribute them uniformly. The flow of the material under pressure as well as mould filling are improved. The improvement and uniformity of the material also reduces manufacturing rejects.

Glass micro-beads do not damage the glass fibers, which is why in the composition according to the invention the use of micro-beads is recommended rather than silica which has an abrasive effect.

Calcium carbonate and glass bead fillers are thus used as agents promoting flow and uniformity. As a result of the uniformity the filler produces a fluid and more easily moulded material.

When desiring to manufacture sanitary appliances with grained or flecked finishes, the flecked grains are provided by pigments which may be of a color identical or differing from the background. It is calcium carbonate grains that will thus produce this coloring effect.

In the case of a colored product, it has also been found that the marble previously recommended as a filler serving to back up the pigment provides a better adhesion of the pigment to the substrate. In the event of a pigment coating, there is thus a better result with marble than with silica as far as pigment adhesion is concerned.

EXAMPLE OF MOULDING MATERIAL COMPOSITION SPECIALLY INTENDED FOR SANITARY WARE

| | |
|---|---|
| unsaturated polyester resin (NPG orthophthalic type) dissolved in styrene | 10 to 20% |
| non-shrink polymer (saturated polyethylene and/or polyester) | 4 to 7.% |
| zinc sulphate (pigment) | 0 to 2.% |
| other pigment | 0 to 0.5% |
| tertiary butyl ethyl-2 perexanoate | 0.03 to 0.5% |
| tertiary butyl perbenzoate | 0.10 to 0.4% |
| tertiary butyl trimethyl-3,3,5 perhexanoate | 0. to 0.1% |
| zinc stearate | 0.75 to 1.7% |
| calcium stearate | 0 to 0.80% |

-continued

| | |
|---|---|
| Parabenzoquinone | 0 to 0.05% |
| Glass fiber 6mm | 5 to 10.% |
| Alumina trihydrate | 30 to 40.% |
| Calcium carbonate | 15 to 25.% |
| Glass micro-beads | 12 to 25.% |

The process used here is a traditional process using hot compression under pressures of 50 to 180 bars, at temperatures of 120 to 1700 C.

Two mixers are preferably used, first a dry mixer with all dry products in the top part and a second liquid mixer with all the liquid products in the lower part.

The performance of the composition according to the invention is apparent through comparative tests, the results of which appear below. The comparison was made between the material already explained conforming to the example of a composition specifically destined for sanitation products and a composition of calcium carbonate base of a common type (not in marble crystalline form) and without glass beads.

Resistance to scratches (charge causing a scratch of 50 microns in width):
  Composition according to the invention: 0.7/0.8 Newton
  Standard composition: 0-3/0.4 Newton
  These measures were achieved using the NF T 51-113 standard.
Absorption of water (volume of water absorbed by a test tube of 17.478 grams):
  Composition according to the invention: 17 milligrams
  Standard composition: over 30 milligrams
  These measures were achieved using the NF T 51-166 standard.
Thermal shocks (state of the product after 500 successive 3-step cycles: 1st step: water at 93° C. for 15 minutes; 2nd step: room temperature for 30 seconds, 3rd step: submersion in water at 15° C. for 10 minutes:
Composition according to the invention: No surface damage.
Standard composition: Cracks on the plug and blistering of the gel coat.
These measures were achieved using following standards: NF EN 198-A5; NF EN 438-2 A8 and R017-AO-Doc4.
Resistance to stains:
  These tests were executed using different solutions:
  A. Phenol-based solution (aqueous solution of 9.5 g/l)
  B. Bleach (5% free chlorine)
  C. Acetic acid (aqueous solution of 6% in volume)
  D. Alcohol (aqueous solution of ethanol of 30% in volume)
  E. Ammonia (aqueous solution of 320 g/l
  F. Caustic soda (aqueous solution of 630 g/l)
  G. Sodium chloride (aqueous solution of 264 g/l)
  H. Sodium carbonate (aqueous solution of 225 g/l)
  I. Citric acid (aqueous solution of 100 g/l)
  J. Hydrochloric acid (aqueous solution of 100 g/l)
  K. Hydrogen peroxide (aqueous solution of 300 g/l)
  L. Methylene blue (aqueous solution of 10 g/l)
  M. Potassium permanganate (aqueous solution of 10 g/l)
  N. Detergent (aqueous solution of 10 g/l at 85' C.)
Composition according to the invention: Washing in water, no stains remain.

Standard composition: Stains remaining from the methylene blue and potassium permanganate.
The measures were achieved using the NF EN 263-A4 standard.

The comparative tests so developed show the importance of the presence of the glass microbeads and the calcium carbonate in marble crystalline form in terms of the performance of the composition. It is particularly notable that the resistance to scratches and the rate of absorption of water are significantly improved. The absorption of water is essentially decreased by one-half while, at the same time, the necessary charge for forming a scratch of 50 microns in width is multiplied by 2 (0.7/0.8 Newton).

The preceding tests also prove the value of the combination of the glass microbeads and the calcium carbonate in marble crystalline form. This combination provides for a composition which may be used in numerous fields of application, particularly in sanitation or plumbing.

Further, it is important to note that the instant composition, by way of the combination of the glass microbeads and the calcium carbonate in marble crystalline form, is remarkable for its stability of color and resistance to abrasion.

Its good resistance to abrasion is a direct consequence of the use of glass microbeads which create an excellent synchronization with the resin, in particular when the beads have a chemical coating. Said resistance to abrasion is also greater than that of compositions using only glass fibers which break under the action of the silica, something which does not occur with glass microbeads.

The use of glass micro-beads allows better mould-filling and improved mixture compactness and uniformity. There will thus be less rejects due to micro-bubbles. Bead stacking and positioning in relation to the fibers practically eliminate the ripple effect following post-shrinkage during cooling, which is also an important advantage in terms of manufacturing costs.

The sanitary appliances thus obtained are of very good quality with regard to water attack. This is achieved by judicious choice of fillers and resins. The micronised alumina trihydrate is used because of its low water absorption as well as its function as material pumping agent. The use of calcium carbonate in its crystalline form as marble with pigment coating allows the elimination of water from the carbonate. With the non-coated carbonate, a slightly higher resin content around the 20% mark may be used. The $CaCO_3$ grains are coated with resin to protect them against the action of water.

Sanitary appliances have thus been produced having a natural appearance and a good mechanical, sound and thermal resistance. These sanitary appliances Will also have all the required esthetic coloring qualities.

Production details of a plain white and a flecked white formula appear below.

| PLAIN WHITE FORMULA | |
|---|---|
| Unsaturated polyester resin (orthophthalic) 65% in styrene | 13.72% |
| Non-shrink polymer (polyethylene & saturated polyester) in styrene | 6.00% |
| Zinc sulphate (pigment) | 1.72% |
| Tertiary butyl ethyl-2 perexanoate | 0.10% |
| Tertiary butyl perbenzoate | 0.14% |
| Tertiary butyl trimethyl-3,3,5 perhexanoate | 0.04% |
| Zinc stearate | 1.37% |
| Parabenzoquinone | 0.01% |

-continued

| PLAIN WHITE FORMULA | |
| --- | --- |
| Glass fiber 6mm | 8.23% |
| Alumina trihydrate | 34.30% |
| Calcium carbonate | 17.15% |
| Glass micro-beads | 17.15% |

The resin, polymer, brightener, peroxide and parabenzoquinone are poured into a liquid mixer. As soon as the mixture is uniform, the contents of the mixer are transferred to a z-paddle type of mixer.

The alumina trihydrate, micronised calcium carbonate, glass micro-beads, zinc sulfide and stripping agent are then added. Mixing proceeds until a uniform dough is obtained. Once the mixture is uniform, the glass fibers are added. Mixing is then effected for a given period so as to impregnate the fiber.

The BMC is then moulded in a steel mould of suitable hardness, preferably chromium-plated, heated to between 140 and 150° C. under a 100 bars pressure. The cross-linking period is between 2 and 5 minutes for a component with a thickness of 5 millimeters.

Moulded products with a scratch-resistance of 50N according to the NFT 51 113 standard are thus obtained, with a water absorption resistance of 0.16% by weight according to ISO 62 standard.

| FLECKED WHITE FORMULA | |
| --- | --- |
| unsaturated polyester resin (orthophthalic) 65% in styrene | 11.21% |
| non-shrink polymer (polyethylene and saturated polyester) 35% in styrene | 5.23% |
| zinc sulphate (pigment) | 1.12% |
| brightener | 0.01% |
| tertiary butyl ethyl-2 perexanoate | 0.16% |
| tertiary butyl perbenzoate | 0.37% |
| zinc stearate | 1.49% |
| Parabenzoquinone | 0.01% |
| Glass fiber 6mm | 7.17% |
| Alumina trihydrate | 32.88% |
| Calcium carbonate (light grey colored aggregate) | 16.44% |
| Glass micro-beads | 23.91% |

The resin, polymer, brightener, peroxide and parabenzoquinone are poured into a liquid mixer. As soon as the mixture is uniform, the contents of the mixer are transferred to a Z-paddle type mixer.

The alumina trihydrate, glass microbeads, zinc sulphide as well as the stripping agent are then added. Mixing proceeds until a uniform dough is obtained. The colored calcium carbonate is then added. When the mixture is uniform, the glass fibers are added. The mixing then continues for a given period of time so as to impregnate the fiber.

The BMC is then moulded in a steel mould of suitable hardness, preferably chromium-plated, heated to between 140° and 150' C. under a 100 bars pressure. The cross-linking period is between 2 and 5 minutes for a component with a thickness of 5 millimeters.

Moulded products with a scratch-resistance of 50N according to the NFT 51 113 standard are thus obtained, with a water absorption resistance of 0.16% by weight according to ISO 62 standard.

I claim:

1. A moulding material composition for use in sanitary appliances comprising:

a polyester resin in a monomer liquid having a polymerizable vinyl group;

a thermoplastic non-shrink polymer;

an organic peroxide;

glass fibers;

a stripping agent selected from the group consisting of: calcium stearate and zinc stearate; and a filler material comprising chemically coated glass micro-beads and calcium carbonate in marble crystalline form said calcium carbonate having a coating, said coating being a polyurethane epoxy.

2. The moulding material composition of claim 1, said thermoplastic non-shrink polymer being selected from the group consisting of: saturated polyester, vinyl polyacetate, ethylene co-polymers, vinyl acetate copolymers, acrylonitrile co-polymers, butadiene co-polymers, styrene co-polymers, and methyl polymethacrylate.

3. A moulding material composition for sanitary appliances consisting essentially of: an unsaturated polyester resin dissolved in styrene, 10 to 20% by weight; a non-shrink polymer, 4 to 7% by weight; a zinc sulphate pigment, 0 to 2% by weight; tertiary butyl ethyl-2 perexanoate, 0.03 to 0.5% by weight; tertiary butyl perbenzoate, 0.10 to 0.4% by weight; tertiary butyl trimethyl-3,3,5 perhexanoate, 0 to 0.1% by weight; zinc stearate, 0.75 to 1.7%; calcium stearate, 0 to 0.8% by weight; parabenzoquinone, 0 to 0.05% by weight; glass fibers, 5 to 10% by weight; alumina trihydrate, 30 to 40% by weight; calcium carbonate, 15 to 25% by weight; glass microbeads, 12 to 25% by weight.

* * * * *